United States Patent
Mizukami

(10) Patent No.: US 7,727,706 B2
(45) Date of Patent: Jun. 1, 2010

(54) RECORDING METHOD FOR DYE-BASED RECORDABLE OPTICAL RECORDING MEDIUM

(75) Inventor: Satoshi Mizukami, Sagamihara (JP)

(73) Assignee: Ricoh Company, Ltd., Tokyo (JP)

(*) Notice: Subject to any disclaimer, the term of this patent is extended or adjusted under 35 U.S.C. 154(b) by 873 days.

(21) Appl. No.: 11/521,278

(22) Filed: Sep. 13, 2006

(65) Prior Publication Data
US 2007/0070875 A1    Mar. 29, 2007

(30) Foreign Application Priority Data
Sep. 14, 2005  (JP) .............................. 2005-266378
Aug. 28, 2006  (JP) .............................. 2006-231123

(51) Int. Cl.
G11B 7/24    (2006.01)
(52) U.S. Cl. ................... 430/270.15; 430/945; 369/288
(58) Field of Classification Search ........................ None
See application file for complete search history.

(56) References Cited

U.S. PATENT DOCUMENTS

| 4,646,103 | A | 2/1987 | Sugiyama et al. | |
|---|---|---|---|---|
| 2003/0086345 | A1* | 5/2003 | Ueki | ..................... 369/47.51 |
| 2003/0174620 | A1* | 9/2003 | Seo et al. | ................. 369/59.11 |
| 2004/0017755 | A1* | 1/2004 | Kato | ........................ 369/59.11 |
| 2004/0081069 | A1 | 4/2004 | Suenaga et al. | |
| 2005/0201243 | A1* | 9/2005 | Ishimi et al. | .............. 369/59.12 |
| 2006/0164946 | A1* | 7/2006 | Tomura et al. | ............ 369/59.11 |
| 2006/0177623 | A1* | 8/2006 | Yashiro et al. | .............. 428/64.4 |
| 2006/0203675 | A1* | 9/2006 | Tomura et al. | ............ 369/59.11 |
| 2006/0291351 | A1* | 12/2006 | Tomura et al. | ............ 369/47.53 |
| 2008/0253253 | A1* | 10/2008 | Yokoi | ....................... 369/59.12 |

FOREIGN PATENT DOCUMENTS

| CN | 1497563 A | 5/2004 |
|---|---|---|
| JP | 2001-155339 | 6/2001 |
| JP | 2001-176073 | 6/2001 |
| JP | 2001-243626 | 9/2001 |
| JP | 2001-273636 | 10/2001 |

(Continued)

OTHER PUBLICATIONS

Machine translation of JP 2005-158162.*

(Continued)

*Primary Examiner*—Martin J Angebranndt
(74) *Attorney, Agent, or Firm*—Cooper & Dunham LLP

(57) ABSTRACT

A recording method for a dye-based recordable optical recording medium including recording shortest marks on a recording layer containing a dye formed on a substrate having a guide groove using one pulse beam, and recording second shortest marks or still longer marks at a pulse power as high as or lower than that of the shortest marks using one pulse beam of which two sites of the front edge and rear edge of pulse are highly energized for a given length of time, wherein a ratio Pc/W4 during recording of each mark at 12 m/s or more is set within 1.0 to 3.0; or the irradiation time of the cooling pulse Tc after that the pulse is applied with beams when the Pc/W4 ratio is 0.14 or less is set to be as long as or shorter than the basic clock cycle T.

5 Claims, 12 Drawing Sheets

FOREIGN PATENT DOCUMENTS

| | | | |
|---|---|---|---|
| JP | 2002-63721 | | 2/2002 |
| JP | 2002-298415 | | 10/2002 |
| JP | 2004-303401 | | 10/2004 |
| JP | 2005-158162 | | 6/2005 |
| JP | 2005-166171 | | 6/2005 |
| JP | 2005-243202 | * | 9/2005 |
| JP | 2005-243208 | * | 9/2005 |
| JP | 2005-317183 | | 11/2005 |
| JP | 2006-4538 | | 1/2006 |
| JP | 2006-12390 | | 1/2006 |
| JP | 2006-107702 | | 4/2006 |
| JP | 2006-164389 | | 6/2006 |

OTHER PUBLICATIONS

May 9, 2008 Chinese official action in connection with corresponding Chinese patent application No. 2006-101537048 (and English translation thereof).

* cited by examiner

RECORDING METHOD FOR DYE-BASED RECORDABLE OPTICAL RECORDING MEDIUM

BACKGROUND

1. Technical Field

This disclosure relates to a recording method for an optical recording medium, a recording medium, and a recording apparatus. The present invention particularly relates to an optical recording and reproducing method for a dye-based recordable DVD, a dye-based recordable optical recording medium and a recording apparatus suitably used for the optical recording and reproducing method.

2. Description of the Related Art

At the present day, developments on speeding up of performance of DVDs±R are more advanced as high-capacity optical discs. To further increase recording capacity of optical discs, as elemental technologies, there are various needs for developments of recording materials to make recording pits microscopic, adoption of image compression technologies typified by MPEG2, and shortening of wavelengths of semiconductor laser for reading recording pits.

For semiconductor lasers in the red wavelength region, only AlGaInP laser diodes having a wavelength of 670 nm have been commoditized for bar code readers or measuring instruments so far, however, along with high-densification of optical discs, red lasers have become to be fully used in the optical storage market. For light sources for DVD drives, laser diodes are standardized with two wavelength bands, i.e., with the 635 nm wavelength band and the 650 nm wavelength band. In contrast, reproducing-only DVD-ROM drives are commoditized with the 650 nm wavelength band.

Typically, for dye-based recordable DVD media in which pits (recording marks) are formed according to heat mode, the pulse width and the recording power of a recording pulse (train) formed by laser light emission at the time of recording are optimized at a specific recording speed, and the states of marks and spaces which are formed at different recording linear speeds vary. Namely, the jitter property degrades due to insufficiency in the heat capacity arising due to the leading heating pulse needed for mark formation, dispersion in the average lengths of marks due to different heating temperatures reached with respect to the optimal decomposition temperature, uniform mark widths being unable to be obtained due to the duty ratios of the optimal heating pulses being different, and the occurrence of thickening or thinning in accordance with the mark lengths.

With a background of these circumstances, for DVDs+R, for example, emission waveforms of recording pulses are described, for example, in DVD+R 4.7 Bytes Basic Format Specifications Ver. 1.3 and in DVD+R 8.5 Bytes Basic Format Specifications Ver. 1.0). The former is written standards for single layer 16× DVD+R media, and the latter is written standards for two-layered 2.4× DVD+R media.

However, particularly when information is recorded on a two-layered recording medium at a recording speed of 2.4× or more, with the emission waveforms of recording pulses described in the above-noted standards, sufficient quality may not be obtained depending on the used recording medium.

Further, with respect to the physical formats of DVD media, in the case of the format of a DVD-R medium, it is standardized in a format in which a portion of a land portion called a land prepit is cut. When this format is adopted, at a land prepit signal (LPPb) of less than 0.16, prepit information such as the prepit address and the like cannot be reproduced well, and when it exceeds 0.32, the LPP signal itself exhibits noise-like behavior in the data region, and many data errors arise. Accordingly, for the LPP, a cut width which suits the recording medium is finely-adjusted using a stamper, and the land cut width must be controlled such that LPPb is in a range of 0.16 to 0.32.

As for optical recording media using dyes for their recording layers, there are various optical recording media such as those using polymethine dyes or polymethine dyes and light stabilizing materials as their recording materials; those having a recording layer having a layer containing a tetraazaporphyrin (porphyradine) dye or a layer containing a cyanine dye +an azo metal chelate dye (salifiable dye), and a reflective layer; those using a formazan (metal chelate) dye +other dyes for the recording materials; and those using dipyrromethene (metal chelate) dyes+other dyes for the recording materials. Further, there are a number of known optical recording media using dyes for their recording materials to perform multipulse recording, however, as far as the present inventors know, there is no document found that information is recorded on a dye-based recordable DVD medium by the use of one pulse beam and recording waveforms formed at the time of recording at high-linear velocity are focused on, as can be seen in the recording method for a dye-based recordable optical recording medium of the present invention.

However, there are recording methods using one pulse beam for one rectangular waveform or one mark (for example, Japanese Patent Application Laid Open (JP-A) Nos. 2001-243626, 2002-063721, 2001-273636, 2002-298415, 2001-176073, and 2001-155339, and U.S. Pat. No. 4,646,103.

SUMMARY

In an aspect of this disclosure, there is provided an optical recording and reproducing method which can obtain excellent recording waveforms during recording information on a dye-based recordable DVD medium at a recording speed of 12 m/s or more.

In another aspect of this disclosure, there are provided a method which adopts a new formatting for recordable DVD systems using a semiconductor laser having an emission wavelength at a wavelength shorter than those of CD media and an effective method of eliminating unrecorded areas in data-added regions similarly to LPP system, and an excellent method causing substantially less data errors arising due to adjusted fine cut pulse width in preparation of a stamper and leak of LPP signals to data regions.

The above-mentioned recording method of a dye-based recordable optical recording medium includes recording shortest marks on a recording layer containing a dye formed on a substrate having a guide groove by the use of one pulse beam, and recording second shortest marks or still longer marks at a pulse power as high as or lower than that of the shortest marks by the use of one pulse beam of which two sites of the front edge and the rear edge of pulse are highly energized for a given length of time, in which a ratio Pc/W4 (Pc represents the exposure dose of a cooling pulse beam applied on the rear edge of pulse, and W4 represents the power of irradiation beams other than those engaged in formation of marks) during recording of each of marks at a recording linear velocity of 12 m/s or more is set within 1.0 to 3.0; or the irradiation time of the cooling pulse Tc after that the pulse is applied with beams when the Pc/W4 ratio is 0.14 or less is set to be as long as or shorter than the basic clock cycle T.

According to the above-mentioned recording method, information can be recorded on a dye-based recordable optical recording medium with low-jitter and low-error rate at a recording speed of 12 m/s or more, and additional data can be effectively written with a high-frequency wobble format which can be more easily produced than land pre-pits used for DVDs-R.

In another aspect of this disclosure, there is provided a recording and reproducing method for a dye-based DVD medium capable of reducing unrecorded areas at the front edge of data-added portions with low-error rate.

The above-mentioned dye-based recordable optical recording medium has a substrate, a recording layer formed on the substrate, and further has at least one layer selected from a reflective layer, a protective layer, an adhesive layer, a protective substrate, and a hard coat layer to be formed on a substrate surface.

The above-mentioned dye-based recordable optical recording medium may take a single layer structure having at least a recording layer, a reflective layer, and a protective layer on or above a substrate having a guide groove with a wobble provided thereon and further having an adhesive layer and a protective substrate through the adhesive layer, or may take a two-layered structure having two pairs of a structural unit which contains a substrate having a guide groove with a wobble provided thereon, the two pairs of the structural unit being bonded such that the adhesive layer is sandwiched therebetween and each of the substrates constitutes an outer surface.

The above-mentioned recording apparatus for a dye-based recordable optical recording medium can comprise a forming unit configured to form a recording layer containing an organic dye on a substrate having a guide groove, a first recording unit configured to record shortest marks on the recording layer by the use of one pulse beam, and a second recording unit configured to record second shortest marks or still longer marks at a pulse power as high as or lower than that of the shortest marks by the use of one pulse beam of which two sites of the front edge and the rear edge of pulse are highly energized for a given length of time, wherein a ratio Pc/W4 (Pc represents the exposure dose of a cooling pulse beam applied on the rear edge of pulse, and W4 represents the power of irradiation beams other than those engaged in formation of marks) during recording of each of marks at a recording linear velocity of 12 m/s or more is set within 1.0 to 3.0; or the irradiation time of the cooling pulse Tc after that the pulse is applied with beams when the Pc/W4 ratio is 0.14 or less is set to be as long as or shorter than the basic clock cycle T.

DESCRIPTION OF THE PREFERRED EMBODIMENTS

Hereinafter, embodiments of the present invention will be described in detail referring to drawings.

Figure 1:
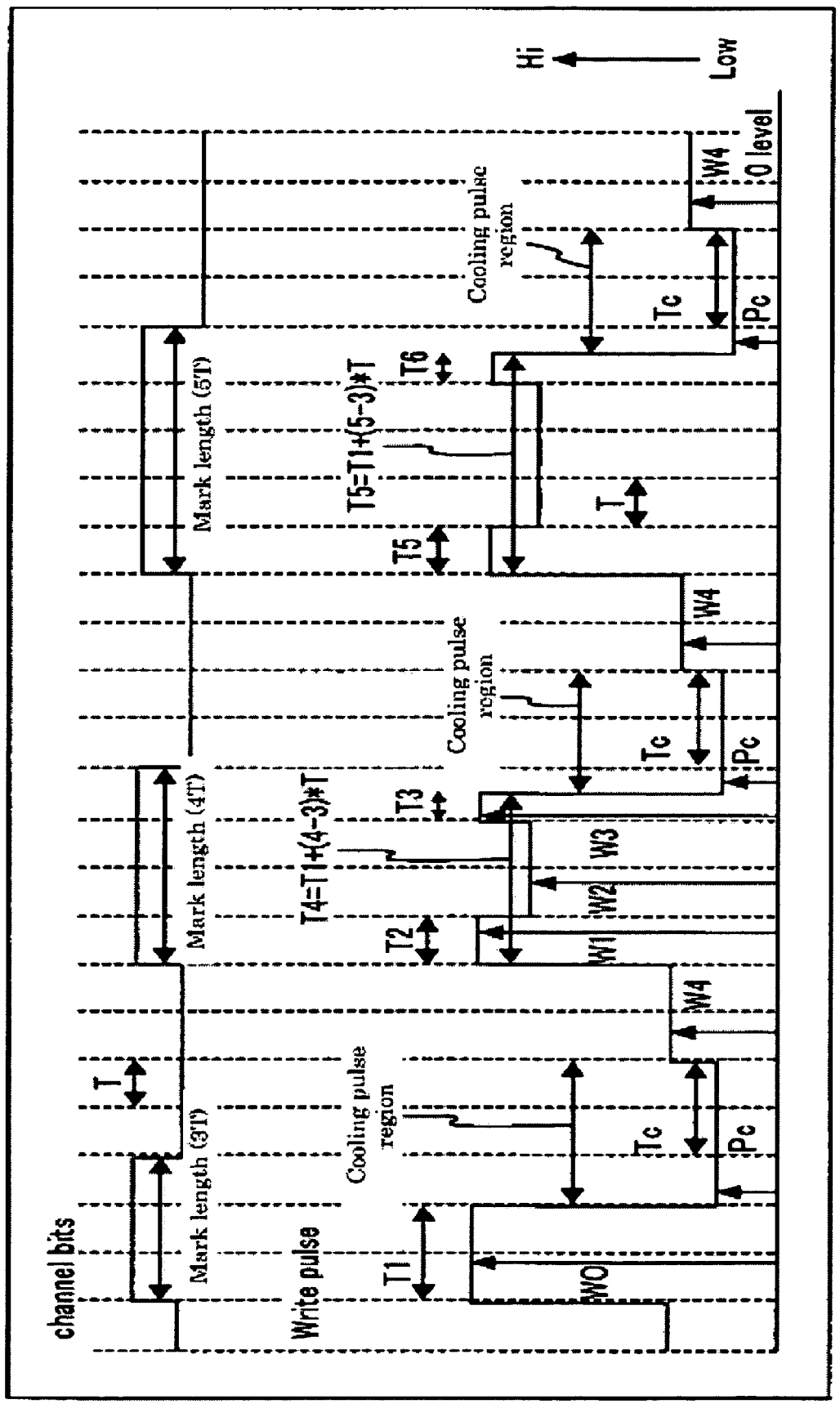
FIG. 1 is an illustration showing a basic pulse exposure pattern of the present invention.
Figure 2A:
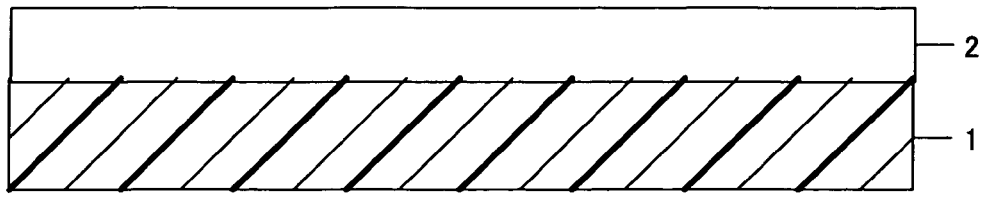
FIG. 2A is a cross-sectional view showing one example of a layer structure of a conventional recordable optical disc.
Figure 2B:
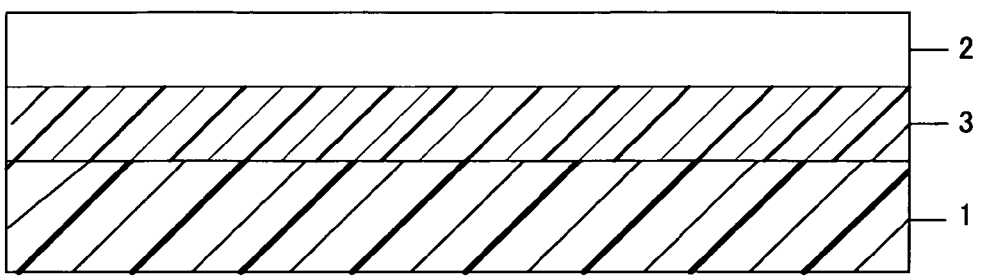
FIG. 2B is a cross-sectional view showing another example of a layer structure of a conventional recordable optical disc.
Figure 2C:
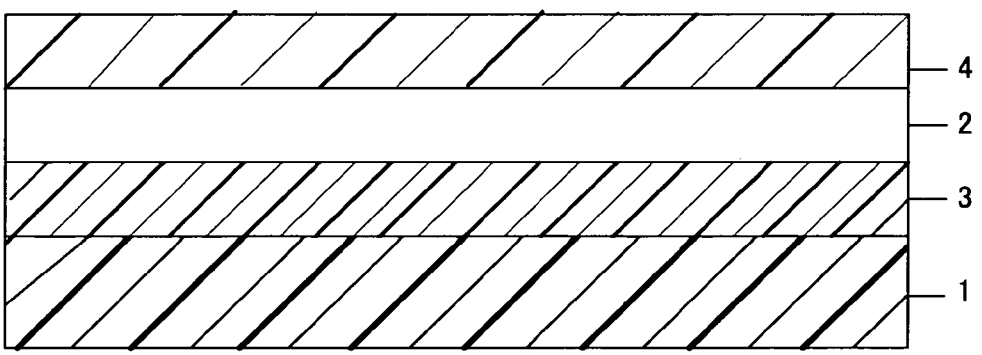
FIG. 2C is a cross-sectional view showing still another example of a layer structure of a conventional recordable optical disc.
Figure 2D:
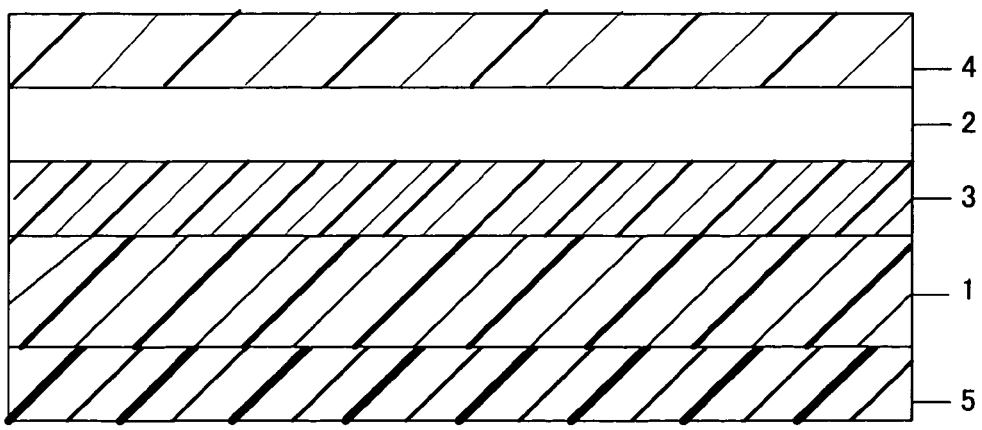
FIG. 2D is a cross-sectional view showing still yet another example of a layer structure of a conventional recordable optical disc.

FIG. 1 is a basic pulse irradiation pattern used in the recording method of the present invention.

The pulse length of shortest marks (T1) is preferably 1/16 times to 48/16 times the basic clock cycle T, and is particularly preferably 25/16 times to 48/16 times the basic clock cycle T. This is because an extremely short pulse length (T1) easily reduces the recording sensitivity.

With respect to second shortest marks or still longer marks, i.e. with respect to marks other than the shortest marks, the length of pulse (T2) of which additional power is applied to the front edge to highly energize is preferably 1/16 times to 32/16 times the basic clock cycle T, and is particularly preferably 16/16 time to 32/16 times the basic clock cycle T. Further, the length of pulse (T3) of which additional power is applied to the rear edge to highly energize is preferably 0/16 times to 32/16 times the basic clock cycle T, and is particularly preferably 0/16 time to 16/16 time the basic clock cycle T.

The ratio of the additional power (W1) the power of regions to which the additional power is not applied (W2), i.e., W1/W2, is preferably greater than 1.0 to 2.0. When the ratio of W1/W2 deviates from the range, the lengths of marks easily deviates from the basic clock cycle, and favorable jitter property may be rarely obtained. Further, when the relation between the additional power W1, the power of which the additional power is not applied W2, the pulse power of the shortest marks (W0), and the power applied at the rear edge of marks other than the shortest marks (W3) satisfies W0≧W1≧W3 and W1≧W3, the relation W3>W2 is preferably satisfied, and in the case of W1>W3, the relation W3≧W2 is preferably satisfied.

In the present invention, before each of pulses is applied with light beams, beams other than the pulse beams engaged in formation of marks are applied thereto. In the example of the pulse irradiation pattern shown in FIG. 1, laser beams are applied between respective recording pulses by the use of an irradiation light level unit for W4. When each of marks is recorded at a recording linear velocity of 12 m/s or more, a cooling pulse region is provided to regions at or subsequent to the rear edge of the respective pulse beams and the exposure dose of the cooling pulse beam is represented by Pc, and a ratio of Pc/W4 is set within 1.0 to 3.0, excellent jitter properties are easily obtainable. The exposure dose Pc is often set at 0.1 mW or less in particular to reduce the thermal interference induced between marks, however, when the exposure dose is set so as to have a relation of Pc≧W4, 3T marks are easily opened, and an excellent jitter value is easily obtainable at pulse beams with low power of irradiation. The effect can be easily obtained particularly when the recording linear velocity is 12.64 m/s (5 inches/s) or more. When the value of Pc/W4 is more than 3.0, the jitter property is easily degraded because 3T marks are easily crushed at pulse beams with high power of irradiation (at high Pw side).

Further, by shortening the cooling pulse (Tc) when the Pc is set at 0 mW and setting W4 ranging from 0.75 mW to 2.25 mW, 3T marks are easily opened, and excellent jitter properties can be easily obtained, and thus effect similar to the above noted effect can be easily obtained.

Under the above-noted conditions, the cooling pulse (Tc) preferably has a pulse length of 40/16 or less the basic clock cycle T, and with this configuration, an excellent jitter value can be easily obtained when the recording linear velocity is 12 m/s or more. In the case of DVD media, the recording linear density is set differently between single layer optical recording media and two-layered optical recording media. The recording linear velocity of single-layered optical recording media is typically set at 3.49 m/s, and the recording linear velocity of two-layered optical recording media is typically set at 3.83 m/s. Particularly when the recording linear density of a two-layered optical recording medium, i.e., the recording linear velocity set for DVD signals is 3.83±0.03 m/s, more excellent effect can be obtained.

A recording method of which one mark is recorded by the use of a plurality of pulses or multi pulses has been proposed, however, when the recording speed is high, a plurality of laser pulses will easily cause fluctuation in rising duration and falling duration of pulse beams, possibly resulting in fluctuation of recording quality and further makes it difficult to respond at high speeds, and thus it is difficult to adopt the recording method when the recording linear velocity is set at 12.64 m/s or more.

In contrast, in the recording method of the present invention, one mark is recorded with the use of one pulse beam. Therefore, the present invention has an advantage that it can provide a recording method causing substantially less fluctuation of recording quality than in recording methods with the use of multi pulses.

Figure 5:
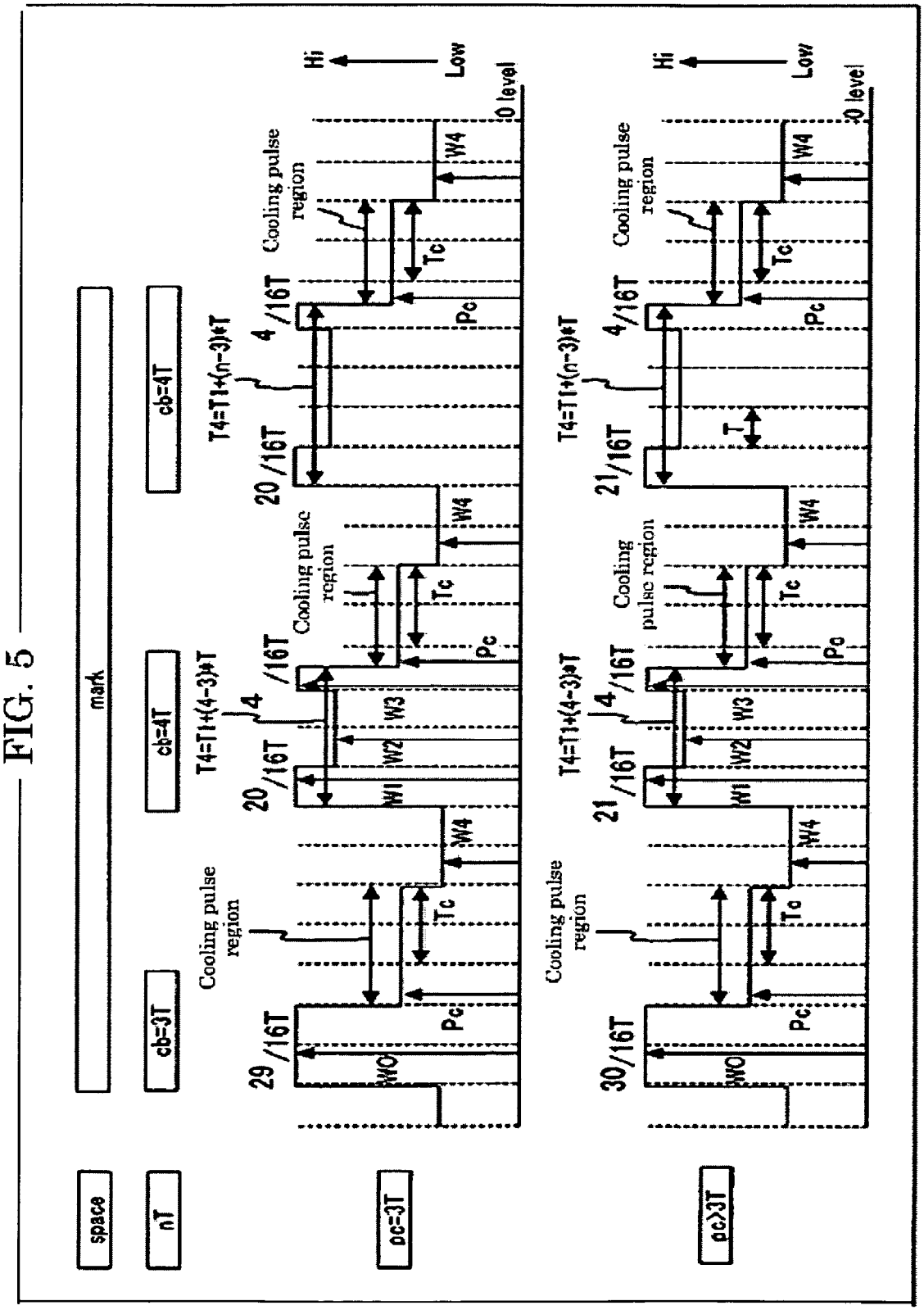
FIG. 5 is an illustration of the pulse exposure pattern used for Examples of the present invention.

FIG. 5 shows an example of a waveform for controlling recording power which is pertinent to the present invention.

Next, the optical properties necessary for the recording layer will be described below.

For the optical properties necessary for the recording layer, a refractive index "n" of a single recording layer with respect to beams at long wavelengths near wavelengths of recording and reproducing, namely, at wavelengths of recording beams and reproducing beams ±5 nm, is preferably within a range of 1.5≦n≦3.0, and the extinction coefficient "k" is preferably within a range of 0.02≦k≦0.2. When the value "n" is less than 1.5, it is unfavorable because sufficient optical changes are hardly obtained, and the recording modulation degree lowers. When the value "n" is more than 3.0, it is unfavorable because the dependency on wavelength is exceedingly high, and errors occur even within a wavelength band for recording and reproducing. In addition, when the value "k" is less than 0.02, it is unfavorable because it results in degraded recording sensitivity. When the value "k" is more than 0.2, it is also unfavorable because a 50% or more reflectance is hardly obtainable.

DVDs are typically standardized at near the wavelength of 650 nm for playback-only machine; the wavelength of pulse beams for recording media is standardized at 650 to 660 nm for popular applications besides 635 nm for authoring exclusive media. However, these wavelengths are center wavelengths, namely each of the wavelengths may be larger or smaller depending on the fluctuations at producing the semiconductor laser diode (LD). Further, LDs typically tend to inherently increase the wavelength when temperature rises. The recording method of the present invention is practicable within the wavelength range of 600 nm to 720 nm including the wavelength band described above, and preferably within a wavelength band of 635 nm to 665 nm.

Next, wobble properties of the wobbling guide groove to be formed on the substrate will be described. The basic clock cycle T for determining the wobble frequency is about 0.133 μm or about 38 nsec in the case of 4.7 GB DVD media.

Typically, for the frequency band of wobble, a basic clock cycle being equal to 150T to 400T is used. The frequency band may not be suitable for high density recording when data is added to be recorded by frequency modulation or phase modulation since significant spaces inevitably exist between the prior data and the data to be additionally recorded. In order to remove this disadvantage, LPP is provided with recordable DVD-R, and the sites to be recorded with data are controlled by the LPP signals.

However, in the controlling by the LPP, there are disadvantages that signals may not be read properly when the signal amplitude from LPP is excessively small, on the contrary, when the LPP signal is excessively large, data errors arise frequently due to leakage of LPP signals into recording data. In order to avoid the disadvantages, the optimum signal amplitude is limited to 0.16≦LPPb≦0.32 in LPP and preferably 0.18≦LPPb≦0.26 in LPP. Accordingly, the cut width of lands should be controlled precisely at preparing the stamper.

In contrast, the employment of a high-frequency wobble can bring about that the LPP is unnecessary no longer, and synchronization is performed by modulating the wobble, therefore, frequent data errors may be avoided as seen in LPP method. The preferred wavelength of the wobble is 4T to 96T. When the wobble frequency is less than 4T, the detection is likely to be difficult due to excessively low frequency, and the reliability as to rotation control and address detection may be insufficient, and when the wobble frequency is more than 96T, the space intervals between additionally recorded data is excessively wide, resulting in a reduced capacity or an insufficient data processing speed.

As for the wobble amplitude of the recordable optical recording media in the present invention, when the ratio of wobble amplitude Wo after passing through appropriate filters such as high filter at 4 MHz and low filter at 30 kHz to push-pull amplitude PP after passing through a filter at 30 kHz, i.e. Wo/PP, satisfies the relation 0.1≦Wo/PP≦0.4, the synchronization is relatively easy, and is preferably 0.15≦Wo/PP≦0.3. When Wo/PP is less than 0.1, the signal intensity is insufficient to synchronize, and when Wo/PP is more than 0.4, the data errors tend to increase. In this type, the optical recording media having larger LPP do not cause significantly data errors as compared to LPP type, namely, data errors tend to increase gradually along with the increase of wobble amplitude.

In the preparation of a stamper, the LPP type requires precise cut width control in order to adjust the LPP cut width into 0.16 to 0.32, whereas the wobble type in the present invention requires no more than the control of high-frequency source and swing level in a high-frequency wobble method (the swing level of the wobble can be arbitrarily controlled to gain excellent reproducibility in the circuit to control the swing level), therefore, the yields of stampers and optical recording media can be increased remarkably.

In the case where a recording layer is formed using an organic dye by solvent coating method is taken for example, for the groove shape of the substrate on which the aforesaid format is formed, the groove depth is preferably 100 nm to 250 nm, and more preferably 150 nm to 200 nm. When the groove depth is less than 100 nm, the tracking may not be controlled appropriately due to insufficient push-pull signals, and then the grove depth is more than 250 nm, it is unfavorable because the transferring ability may be degraded at the time of molding substrates.

Preferably, as for the dye groove depth d1 when a dye recording layer is provided, the following relation is preferable:

$$1,200 \leq d1 \times m \leq 160,000$$

where mT: wobble frequency (m: natural number)

When (d1×m) is less than 1,200, the differential signals are insufficient, the tracking may not be performed appropriately at recording and reproducing, and when (d1×m) is more than 160,000, oscillation may be induced, which may adversely effect on the tracking. Further, the groove depth of substrates are typically limited by the transferring limit due to the substrate molding described above, thus the groove depth is limited to 160,000 or less in practice.

The pitch of tracks is typically required to be 0.64 μm to 0.8 μm in order to assure the recording density of 4 GB to 5 GB. The groove width depends on the recording material in general; usually the half-width is 0.18 μm to 0.40 μm in almost all organic materials.

Next, the following describes the layer structure of the dye-based recordable optical recording medium of the present invention, and the essential properties and the component materials thereof.

Figure 3A:
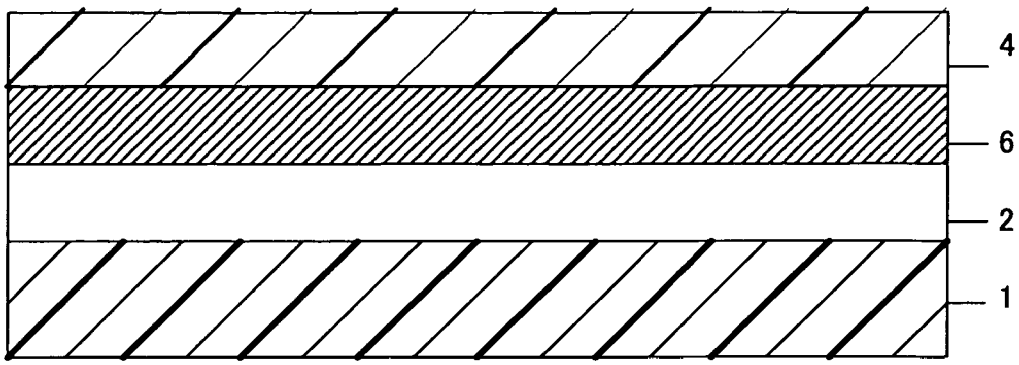
FIG. 3A is a cross-sectional view showing one example of a layer structure of a conventional CD-R medium.
Figure 3B:
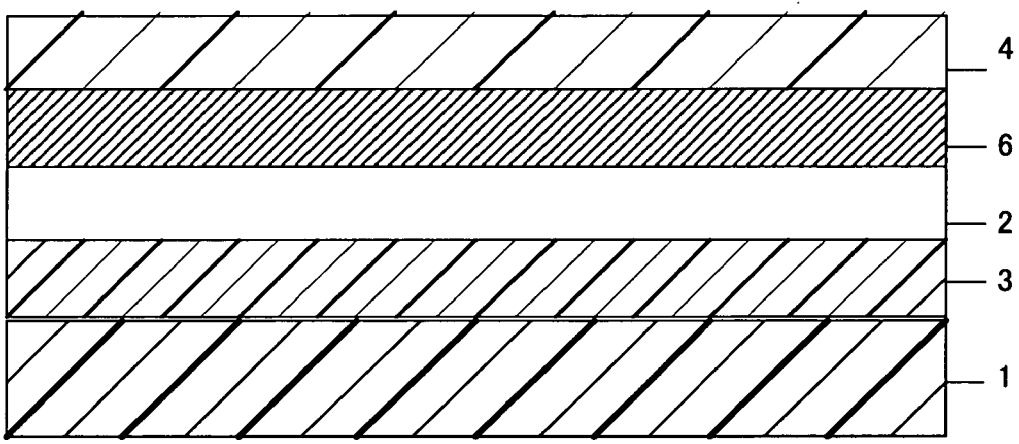
FIG. 3B is a cross-sectional view showing another example of a layer structure of a conventional CD-R medium.
Figure 3C:
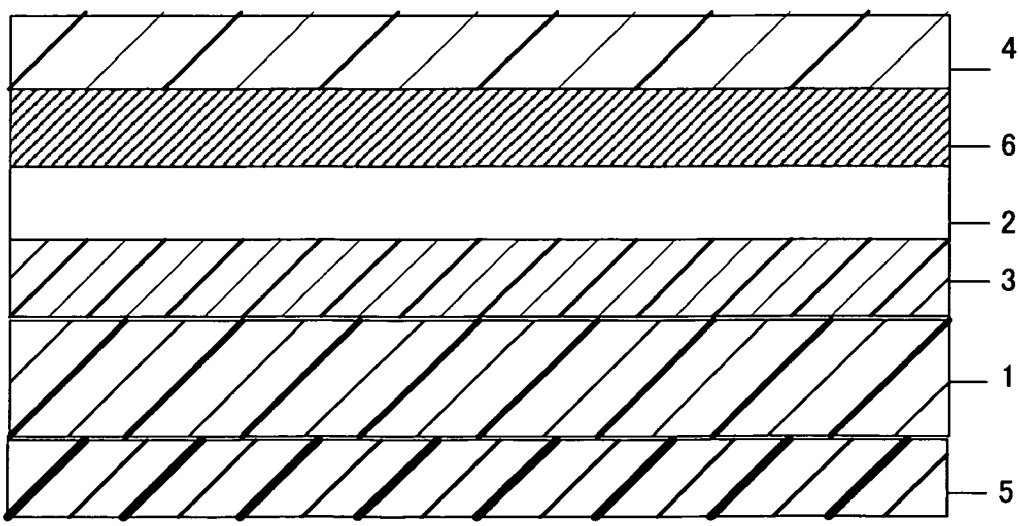
FIG. 3C is a cross-sectional view showing still another example of a layer structure of a conventional CD-R medium.
Figure 4A:
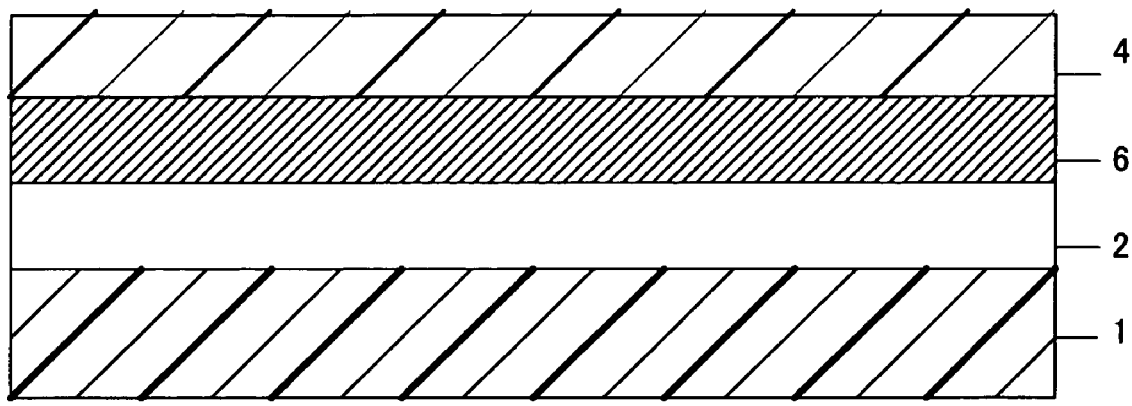
FIG. 4A is a cross-sectional view showing one example of a layer structure of a conventional recordable DVD medium.
Figure 4B:
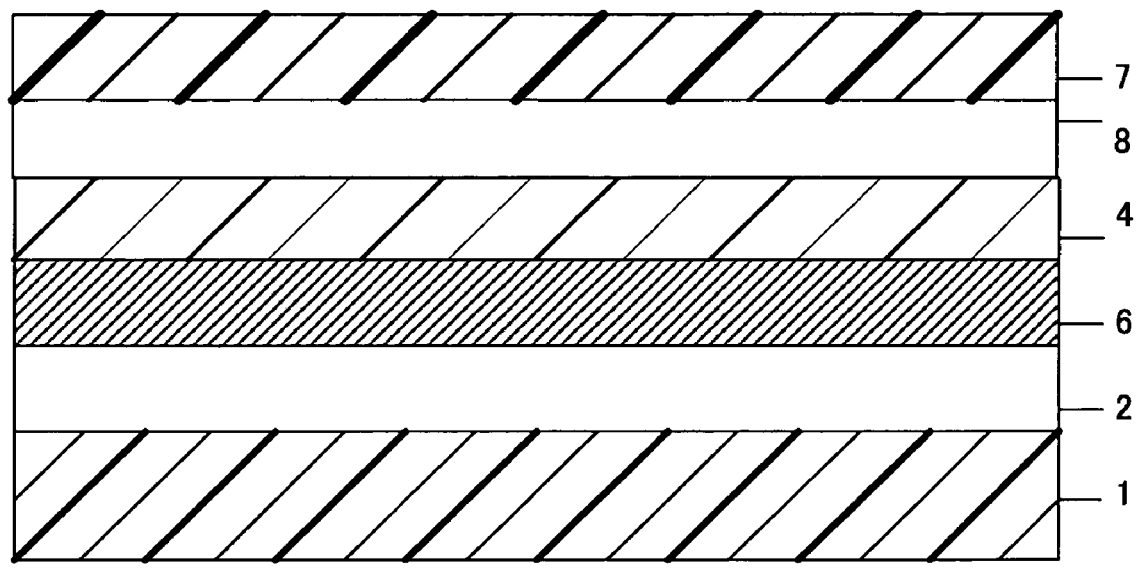
FIG. 4B is a cross-sectional view showing another example of a layer structure of a conventional recordable DVD medium.
Figure 4C:
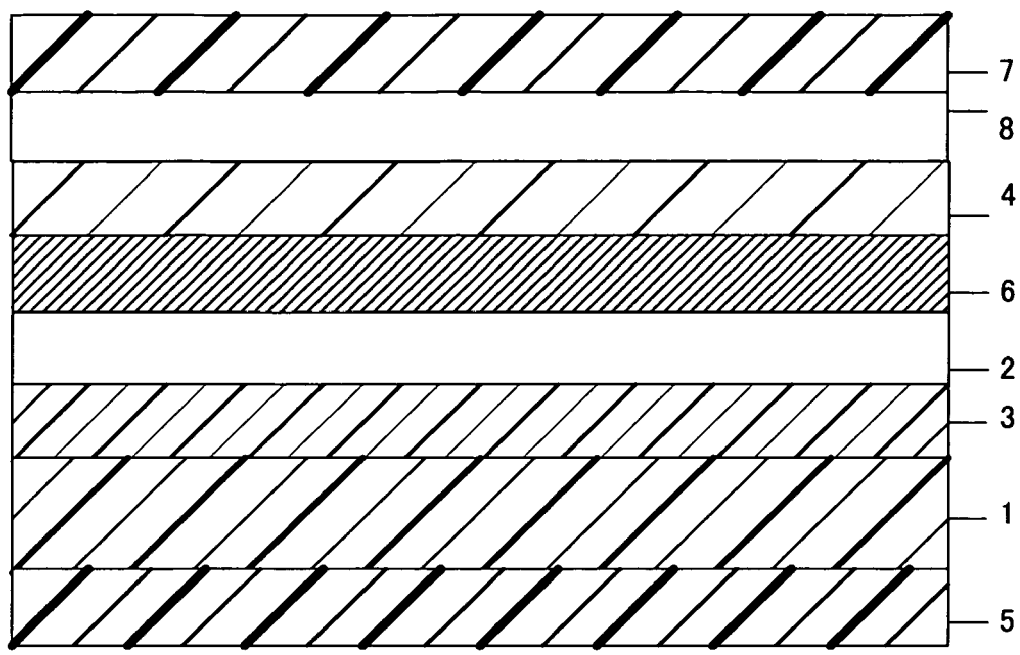
FIG. 4C is a cross-sectional view showing still another example of a layer structure of a conventional recordable DVD medium.
Figure 4D:
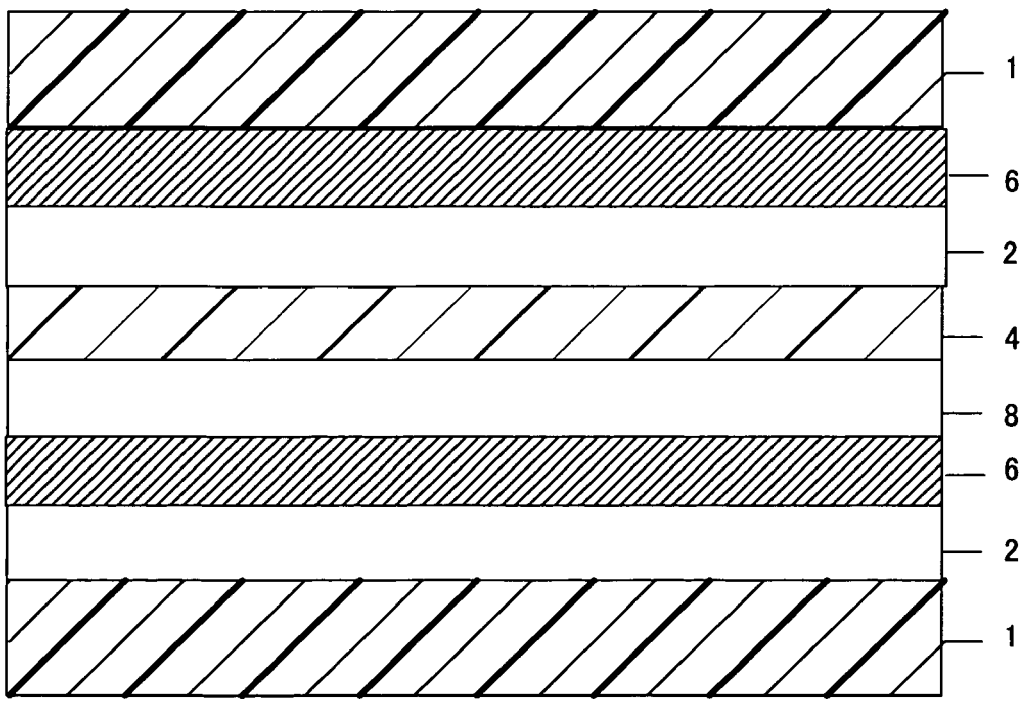
FIG. 4D is a cross-sectional view showing still yet another example of a layer structure of a conventional recordable DVD medium.

FIGS. 2A to 2D exemplarily show a layer structure of a conventional recordable optical disc, respectively, FIGS. 3A to 3C exemplarily show a layer structure of a conventional CD-R medium, respectively, and FIGS. 4A to 4D exemplarily show a layer structure of a recordable DVD medium, respectively. In particular, FIG. 4D exemplarily shows a layer structure of an optical recording medium having two layers on one surface thereof. The preferred basic layer structure of the dye-based recordable optical recording medium of the present invention is, as shown in FIGS. 4B to 4D, that a first substrate and a second substrate (or a protective substrate) are bonded with an adhesive so as to sandwich a recording layer therebetween.

The recording layer may be an organic dye layer alone or may be formed in a laminate structure which contains an organic dye layer and a reflective layer to enhance the reflectance. An undercoat layer or a protective layer may be formed between the recording layer and a substrate, and in order to enhance properties of recordable optical discs, each of the individual layers may be formed with two or more layers in a laminate structure. The most typically used layer structure is formed with a first substrate, a recording layer or an organic dye layer, a reflective layer, a protective layer, an adhesive layer, and a second substrate (a protective substrate).

Hereinafter, individual layers constituting the dye-based optical recording medium of the present invention will be described in detail.

Substrate

When recording and/or reproducing is performed from the substrate side, the substrate 1 must be transparent to laser beams, however, when recording and/or reproducing is performed from the recording layer side, the substrate is not necessarily transparent to laser beams. Examples of materials available for the substrate include plastics such as polyester resins, acrylic resins, polyamide resins, polycarbonate resins, polyolefin resins, phenol resins, epoxy resins, and polyimide resins; glass, ceramics, and metals. On the surface of the substrate, a guide groove or guide pits for tracking, and pre-format such as address signals may be formed.

Recording Layer

On the recording layer 2, somewhat optical changes are induced by irradiation of a laser beam, and information is recorded by means of differences before and after the optical changes. For the material for the recording layer, a material containing an organic dye, for example, a material containing an organic dye as the main component is used. Here, the term "the main component" means that an organic dye in a sufficient amount for recording and reproducing information is contained, and typically, only an organic dye or organic dyes are used except for a small amount of additives to be suitably added in accordance with the necessity.

Examples of the organic dyes include azo dyes, formazan dyes, dipyrromethene dyes, (poly)methyne dyes, naphthalocyanine dyes, phthalocyanine dyes, tetraazaporphyrin dyes, squarylium dyes, chloconium dyes, pyrylium dyes, naphthoquinone dyes, anthraquinone dyes (indanthrene dyes), xanthene dyes, triphenylmethane dyes, azulene dyes, tetrahydrocholine dyes, phenanthrene dyes, triphenothiazine dyes, and metal complexes thereof. Among these dyes, azo (metal chelate) dyes, formazan (metal chelate) dyes, squarylium (metal chelate) dyes, dipyrromethene (metal chelate) dyes, trimethynecyanine dyes, tetraazaporphyrin dyes, and metal complexes thereof are preferable.

With respect to the thermal decomposition property of these dyes to be used for the recording layer, the initial decomposition temperature or kick-off temperature is preferably 100° C. to 360° C., and particularly preferably 100° C. to 350° C. When the kick-off temperature is more than 360° C., the pits may not formed successfully, thus the jitter property may be degraded, and when the kick-off temperature is less than 100° C., the storage stability of disc may be degraded.

To the dyes described above, other organic dyes, metals, and/or metal compounds may be added in order to enhance the optical properties, recording sensitivity and/or signal properties, or a dye-layer and a layer containing other organic dyes, metals, and/or metal compounds may be formed as a recording layer in a laminate structure.

Examples of such additional metals and/or metal compounds include In, Te, Bi, Se, Sb, Ge, Sn, Al, Be, $TeO_2$, SnO, As and Cd. Each of these metals and metal compounds may be used alone or may be used in combination of two or more to be dispersed in and mixed with the above-noted dyes or to be formed in a laminate structure.

Further, in the dye materials described above, for example, various polymer materials such as ionomer resins, polyamide resins, vinyl resins, natural polymers, silicones, and liquid rubbers; silane coupling agents may be dispersed and mixed. For the purpose of improving properties, stabilizers such as transition metal complexes; dispersing agents; flame-retardants; lubricants; antistatic agents; surfactants; and plasticizers may be used along with the dye materials.

The recording layer can be formed by conventional methods such as vapor deposition method, sputtering method, CVD method, and solvent coating method. When a solvent coating method is used, the dyes and materials described above are dissolved in an organic solvent to prepare a coating solution, then the coating solution is applied over a surface of the substrate by conventional coating method such as spray coating, roller coating, dip coating, and spin coating. Examples of the organic solvent for use include alcohols such as methanol, ethanol, and isopropanol; ketones such as acetone, methyl ethyl ketone, and cyclohexanone; amides such as N,N-dimethylformamide and N,N-dimethylacetamide; sulfoxides such as dimethylsulfoxide; ethers such as tetrahydrofuran, dioxane, diethylether, and ethyleneglycol monomethylether; esters such as methyl acetate and ethyl acetate; halogenated aliphatic hydrocarbons such as chloroform, methylene chloride, dichloroethane, carbon tetrachloride, and trichloroethane; aromatics such as benzene, xylene, monochlorobenzene, and dichlorobenzene; cellosolves such as methoxy ethanol, ethoxy ethanol; and hydrocarbons such as hexane, pentane, cyclohexane, and methyl cyclohexane.

The thickness of the recording layer is appropriately 10 nm to 10 μm, and preferably 50 nm to 200 nm.

Undercoat Layer

The undercoat layer 3 is formed for the purposes of (1) improving the adhesion, (2) serving as a barrier layer against water or gases, (3) improving the shelf life of the recording layer, (4) improving the reflectance of the recording layer, (5) protecting the substrate from solvents, and/or (6) forming a guide groove, guide pits, preformat, and the like. To attain the above-noted purpose (1), various polymer compounds such as ionomer resins, polyamide resins, vinyl resins, natural resins, natural polymers, silicones, and liquid rubbers, and silane coupling agents may be employed. To attain the purposes (2) and (3), inorganic compounds such as SiO, $MgF_2$, $SiO_2$, TiO, ZnO, TiN, and SiN can be used besides the above-described polymer materials. Further, metals and semimetals such as Zn, Cu, Ni, Cr, Ge, Se, Au, Ag, and Al can be used. To attain the purpose (4), organic thin films having a metal luster made of a metal or metals such as Al, Au, and Ag, methine dye or xanthene dye may be used. To attain the purposes (5) and (6), an ultraviolet-curing resin, a thermosetting resin, or a thermoplastic resin can be used.

The thickness of the undercoat layer is preferably 0.01 μm to 30 μm, and more preferably 0.05 μm to 10 μm.

Reflective Layer

Examples of materials of the reflective layer 6 include metals and semimetals exhibiting high reflectance and corrosion resistance such as Au, Ag, Cr, Ni, Al, Fe, and Sn. Among these metals, Au, Ag, and Al are particularly preferred in view of the reflectance and the productivity. These metals and semimetals may be used alone or in combination of two or more as an alloy.

To form the reflective layer in a thin film, it may be formed by deposition, sputtering, etc. The thickness of the reflective layer is typically 50 nm to 500 nm, and preferably 100 nm to 300 nm.

Protective Layer and Hard Coat Layer to be Formed on a Substrate Surface

The protective layer 4 and the hard coat layer to be formed on a substrate surface 5 may be provided in order to (1) protect the recording layer or the reflection absorbing layer from scratches, dust, and contamination, (2) improve the storage stability of the recording layer (reflection absorbing layer), and (3) increase the reflectance. To satisfy these purposes, materials similar to those used for the undercoat layer may be used. In addition, it is also possible to use organic materials of thermosoftening resins or thermosetting materials such as polymethyl acrylate resins, polycarbonate resins, epoxy resins, polystyrene resins, polyester resins, cellulose resins, aliphatic hydrocarbon resins, natural rubbers, styrene-butadiene resins, chloroprene rubbers, waxes, alkyd resins, drying oils, and rosins. Among these, UV curable resins are most preferably used from the perspective of the superiority in productivity.

The thickness of the protective layer or the hard coat layer to be formed on a substrate surface is typically 0.01 μm to 30 μm, and preferably 0.05 μm to 10 μm.

Materials used for the undercoat layer, the protective layer or the hard coat layer to be formed on a substrate surface may contain stabilizers, dispersing agents, flame-retardants, lubricants, antistatic agents, surfactants, and plasticizers as is the case with the recording layer.

Protective Substrate

The protective substrate 7 is required to be transparent to laser beams when the laser beam is irradiated from the protective substrate, however, when the protective substrate is used for protection purpose, the transparency is not required. The materials for the protective substrate are utterly the same as those for the substrate; for example, plastics such as polyester resins, acrylic resins, polyamide resins, polycarbonate resins, polyolefin resins, phenol resins, epoxy resins, and polyimide resins; glass, ceramics, metals, and the like may be used.

Adhesive Layer

The material of the adhesive layer 8 may be suitably selected, provided that the two recording media can be bonded together, and a UV curable adhesive or a hot-melt adhesive is preferable in view of productivity.

Hereinafter, the recording and reproducing apparatus of the present invention will be described.

Optical discs are used as media for storing a large amount of information, typically, information is recorded on and reproduced from an optical disc by an optical disc drive or a recording and reproducing apparatus. Here, configuration of optical discs and optical disc drives will be outlined.

DVD-RAM·Wo, DVD-R, DVD+R, and DVD-RAM, DVD-RW, and DVD+RW discs are recordable DVD (Digital Versatile Discs). DVD-RAM·Wo, DVD-R, and DVD+R discs are DVD capable of recording only once, which are referred to as DVD Write Once. DVD-RAM, DVD-RW, and DVD+RW discs are DVD capable of recording more than once. As for Optical discs such as DVD+R and DVD+RW, information is recorded and reproduced by an optical disc drive as shown in FIG. 6.

Figure 6:
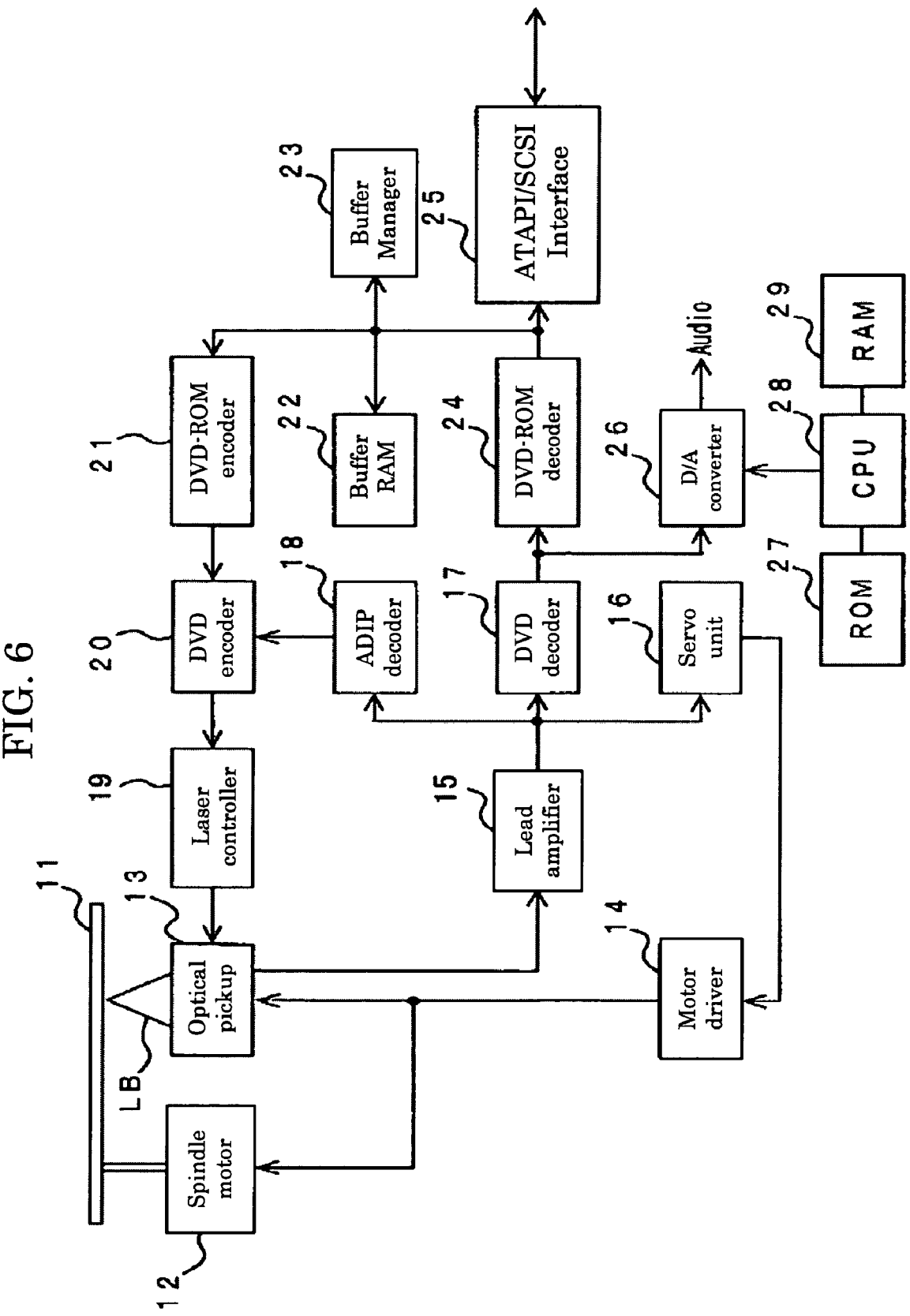
FIG. 6 is a functional block diagram showing a configuration example of the optical disc drive of the present invention.

FIG. 6 is a block diagram exemplarily showing essential parts of an optical disc drive. The optical disc drive shown in the figure includes optical disc 11, spindle motor 12, optical pickup 13, motor driver 14, read amplifier 15, servo unit 16, DVD decoder 17, ADIP decoder 18, laser controller 19, DVD encoder 20, DVD-ROM encoder 21, buffer RAM 22, buffer manager 23, DVD-ROM decoder 24, ATAPI/SCSI interface 25, D/A converter 26, ROM 27, CPU 28, and RAM 29. In the figure, LB represents a laser beam, and Audio represents audio output signals.

In FIG. 6, the arrow marks indicate the main direction of data flow. In order to avoid a complicated expression in the figure, the CPU 28 that controls the respective blocks in FIG. 6 is expressed by removing the connections with the respective blocks using only wide lines. In the ROM 27, a control program written in codes that can be decoded by the CPU 28 is stored. When the power source of the optical disc drive is turned on, the program is loaded on a main memory (not shown), the CPU 28 controls operations of the respective parts in accordance with the program, and stores necessary data to control into the RAM 29 temporarily.

The structure and operations of the optical disc drive are as follows. The optical disc 11 is driven to rotate by the spindle motor 12. The spindle motor 12 is controlled by the motor driver 14 and the servo unit 16 so as to make constant the linear velocity or the angular velocity. The linear velocity or the angular velocity may be changed step-wise.

The optical pickup 13 contains a semiconductor laser, optical system, focus actuator, track actuator, receiving optics, and position sensor (not shown respectively), and irradiates laser beam LB onto optical disc 11. The optical pickup 13 can be moved in a sledge direction by a seek motor. These focus actuator, track actuator and seek motor are controlled by the motor driver 14 and the servo unit 16 based on the signals from the receiving optics and the position sensor so as to situate the spot of laser beam LB on the intended site of the optical disc 11.

In reading stage, reproducing signals obtained by the optical pickup 13 are amplified and binarized by the read amplifier 15, and input into the DVD decoder 17. The input and binarized data is demodulated by 8/16 at the DVD decoder 17. The recording data is bundled by every 8 bits and modulated to 8/16 modulation, and 8 bits are transformed into 16 bits in the modulation. In this case, the combined bits are assigned such that the prior numbers of "1" and "0" are equal when averaged, which is referred to as "suppression of DC component" wherein the fluctuation of slice level of DC cut regeneration signals is suppressed.

The demodulated data is processed with respect to deinterleave and error correction. Then the data is input into the DVD-ROM decoder 24, and further processed with respect to error correction so as to enhance the data reliability. The data subjected to two times error correction is stored once at the buffer RAM 22 by means of the buffer manager 23, and transferred to a host computer (not shown) at a time through the ATAPI/SCSI interface 25 in a state that is collected as sector data. In the case of music data, the data output from the DVD decoder 17 is input to the D/A converter 26 and then is taken out as audio output signals Audio of analog data.

Further, at the stage of writing, the data sent from the host computer through the ATAPI/SCSI interface 25 is stored at the buffer RAM 22 by the buffer manager 23 once. Then, the writing operation starts; before the operation, the laser spot is required to be situated at the writing initiating site. The site is determined from wobble signals which are previously recorded with slightly sinusoidal waves of tracks on the optical disc 11 in the case of DVD+RW/+R.

Further, the site is determined by land pre-pits in the case of DVD-RW/-R, by pre-pits in the case of DVD-RW/RAM·WO in place of wobble signals.

The wobble signals in DVD RW/+R discs contain address information of so-called ADIP (ADress In Pre-groove), which are taken out by the ADIP decoder 18. The synchronous signals generated by the ADIP decoder 18 are input to the DVD encoder 20, which enable to write data at correct sites on the optical disc 11. The data in the buffer RAM 22 are subjected to addition of error correction code and/or interleave by the DVD-ROM encoder 21 and/or the DVD encoder 20, then are recorded into the optical disc 11 by the use of recording waveforms in the present invention through the laser controller 19 and the optical pickup 13.

The recording and reproducing apparatus of the present invention functions to record, on a recording layer containing an organic dye as the main component and being formed on a substrate having a guide groove, each of shortest marks by the use of one pulse beam being more highly energized than pulse beams for marks other than the shortest marks, to record second shortest marks or still longer marks by the use of one pulse beam at a pulse power as high as or lower than that of the shortest marks by the use of one pulse beam of which two sites of the front edge and the rear edge of pulse are highly energized for a given length of time, in which a ratio Pc/W4 (Pc represents the exposure dose of a cooling pulse beam applied on the rear edge of pulse, and W4 represents the power of irradiation beams other than those engaged in formation of marks) during recording of each of marks at a recording linear velocity of 12 m/s or more is set within 1.0 to 3.0; or the irradiation time of the cooling pulse Tc after that the pulse is applied with beams when the Pc/W4 ratio is 0.14 or less is set to be as long as or shorter than the basic clock cycle T. Therefore, it is possible to realize high-quality recording at high-linear velocities.

The recording and reproducing apparatus of the present invention enables optimum recording conditions to be set on a disc by using a dye-based recordable DVD medium in which the pulse power information of the optimum shortest marks and the power information of irradiation beams other than pulse beams engaged in formation of marks is preliminarily recorded in the guide groove. Therefore, more appropriate recording is possible without causing recording errors by reading the pulse power information recorded in the guide groove and setting recording conditions by the use of the recording and reproducing apparatus.

Specific examples of DVD+R include the one that is capable of encoding ADIP information recoded in a guide groove as wobble signals and setting the pulse power.

Figure 7:
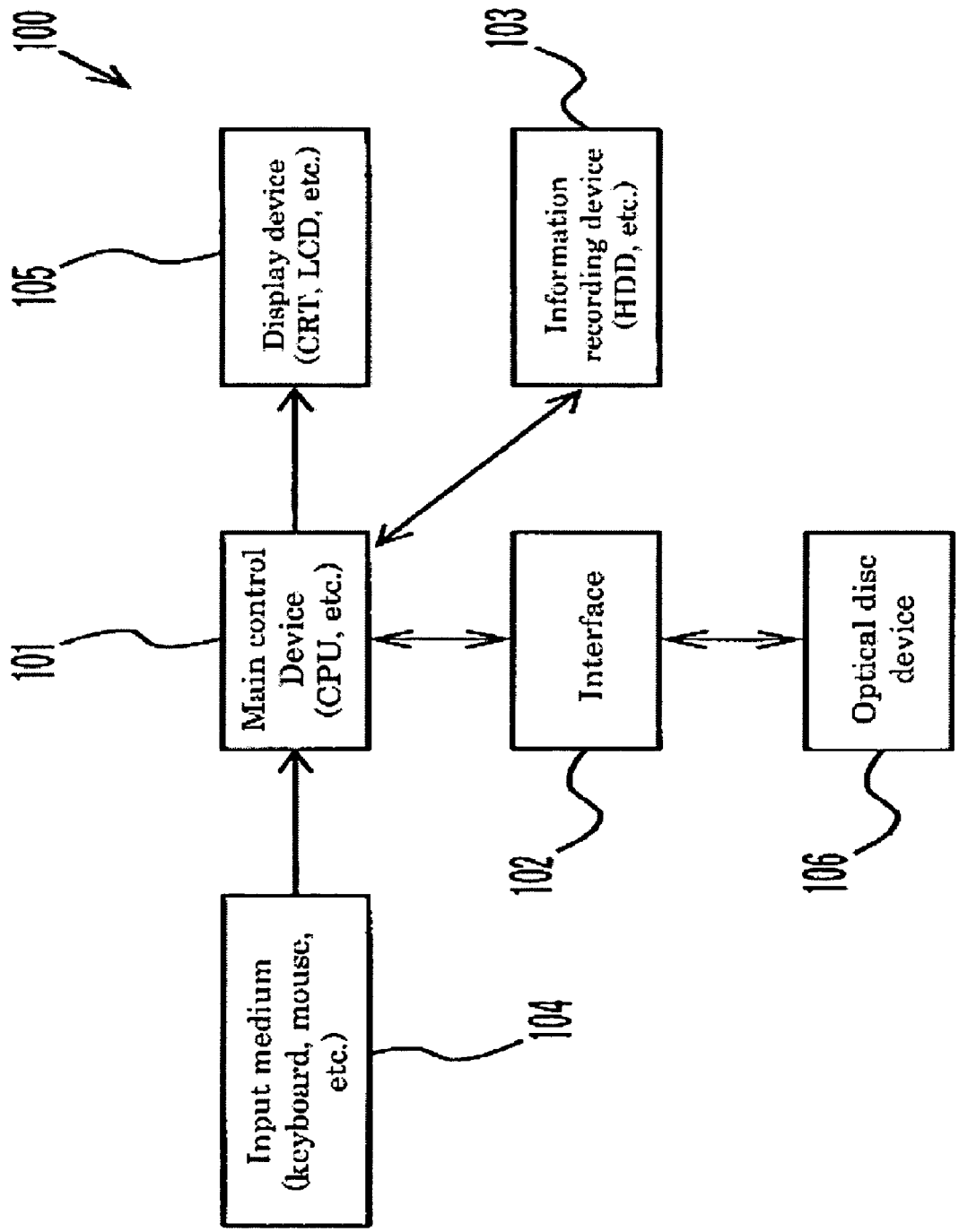
FIG. 7 is a schematic block diagram showing an information processor using the optical disc drive of the present invention.

FIG. 7 is a view schematically showing an information processing unit utilizing the optical disc drive shown in FIG. 6. Information processing unit 100 is equipped with main control device 101, interface 102, recording device 103, input device 104, and display device 105, and optical disc drive 106.

The main control device 101 is structured from a CPU (central processing unit, micro computer), main memory, and the like (respectively not shown), and controls the entire host computer.

The optical disc drive 106 contains an interactive communication interface, and the interface 102 is based on standard interfaces such as ATAPI and SCSI. The interface 102 is connected to the communication interface of the optical disc drive 106. The connection between the respective interfaces may be not only cable connection by means of communication line or cable such as SCSI cable but also wireless connection utilizing infrared ray for example.

Information recording device 103 (HDD, hard disc) is equipped with a program written by codes readable by the microcomputer of the main control device 101. When the driving power source of the information processing unit 100 is turned on, the program is loaded on the main memory of the main control device 101.

The display device 105 is equipped with a displaying part (not shown) such as a CRT, a liquid crystal display (LCD), and a plasma display panel (PDP), and displays various information from the control device 101.

The input device 104 is equipped with at least one input medium (not shown) such as a keyboard, mouse, and pointing device, and informs the main control device 101 of a variety of information input by users. Information from the input media may be input by means of wireless connection. Further, CRT equipped with a touch panel may be available as an integrated device of display 105 and input device 104. The information processing unit 100 is equipped with an operating system (OS). All of the devices constituting the information processing unit 100 are controlled by the operating system (OS).

Examples

Hereinafter, the present invention will be further described in detail referring to specific Examples and Comparative Examples, however, the present invention is not limited to the disclosed examples.

Polycarbonate having a diameter of 120 mm and a thickness of 0.57 mm was used for a second substrate. The second substrate was formed so as to have a convexo-concave pattern of a guide groove having a groove depth of 32 nm, a groove width (base width) of 0.25 µm, a track pitch of 0.74 µm, and a wobble frequency equal to 32T. On a surface of the second substrate, a second reflective layer was formed using AgIn (mixture ratio: about 99.5:0.5) having a thickness of around 150 nm by sputtering, using Ar as a sputtering gas.

Next, a squarylium dye compound represented by the following Chemical Formula (1) was dissolved in 2,2,3,3-tetrafluoropropanol to prepare a coating solution. Over the surface of the second reflective layer, the coating solution was applied by spin-coating, and the surface of the reflective layer with the coating solution applied thereon was dried to form a second recording layer having a thickness of around 80 nm. For the optical absorption spectrum of the second recording layer, the maximum absorption wavelength was 607 nm and the absorbance (Abs) at the maximum absorption wavelength was 1.19. The thickness of the dye layer was checked using a cross-sectional transmission electron microscope image. The thermal decomposition temperature of the dye was 280° C.

Chemical Formula (1)

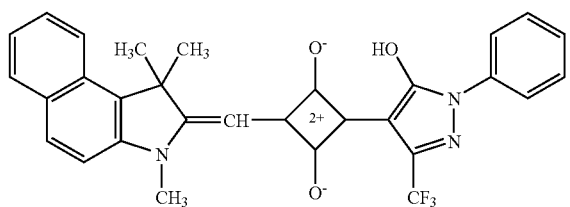

Over the surface of the second recording layer, ZnS—SiC (mixture ratio: 8:2) was applied by sputtering using Ar as a sputtering gas so as to have a thickness of around 150 nm to form an inorganic protective layer, thereby preparing a second information substrate.

In the meanwhile, polycarbonate having a diameter of 120mm and a thickness of 0.58 mm was used for a first substrate. The first substrate was formed so as to have a convexo-concave pattern of a guide groove having a groove depth of 150 nm, a groove width (base width) of 0.25 µm, and a track pitch of 0.74 µm. A coating solution was prepared by mixing a squarylium dye compound represented by the above Chemical Formula (1) with a formazan metal chelate represented by the following Chemical Formula (2) at a weight ratio of 7:3 and dissolving the mixture in 2,2,3,3-tetrafluoropropanol. The coating solution was applied over the surface of the first substrate by spin-coating to form a first recording layer having a thickness of around 50 nm. Then, over the surface of the first recording layer, AgIn (mixture ratio: 99.5:0.5) was applied by sputtering using Ar as a sputtering gas so as to have a thickness of around 12 nm then to form a reflective layer, thereby preparing a first information substrate.

Chemical Formula (2)

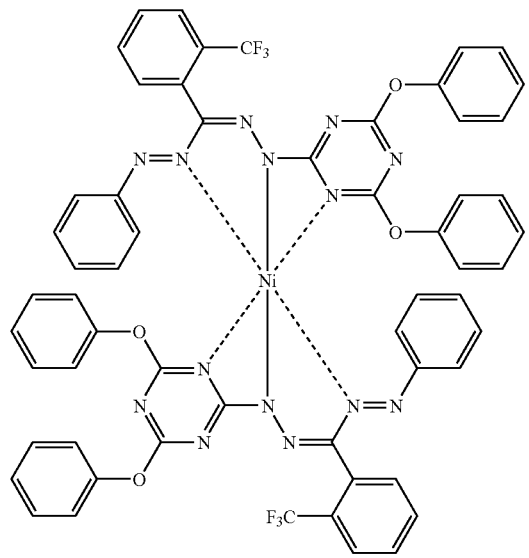

Next, the first and second information substrates were bonded together using a ultraviolet curable adhesive (KARAYAD DVD576, available from Nippon Kayaku Co., Ltd.) to thereby prepare an optical recording medium having a two-layered structure on one surface thereof, as shown in FIG. 4. DVD (8-16) signals were recorded on the second recording layer of the optical recording medium under the conditions of a wavelength of 657 nm, a lens numerical aperture (NA) of 0.65, and a linear velocity of 12.64 m/s, and the signals were reproduced at a linear velocity of 3.83 m/s, and then the optical recording medium was evaluated. For the evaluation system, ODU1000 (available from PULSTEC INDUSTRIAL CO., LTD) was used.

The recording pulse waveform shown in FIG. 5 was used to measure the recording power (WO) dependency of the jitter values shown in the following Examples.

TABLE 1

Figure 8:
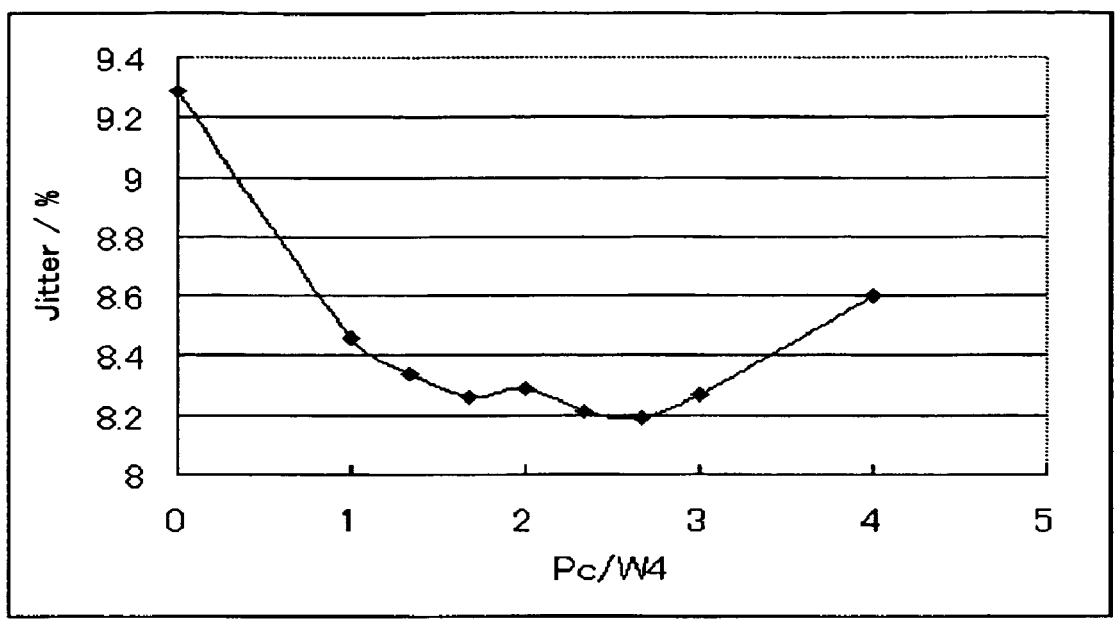
FIG. 8 is a graph showing one example of change in jitter value relative to values of Pc/W4 in the present invention.
Figure 9:
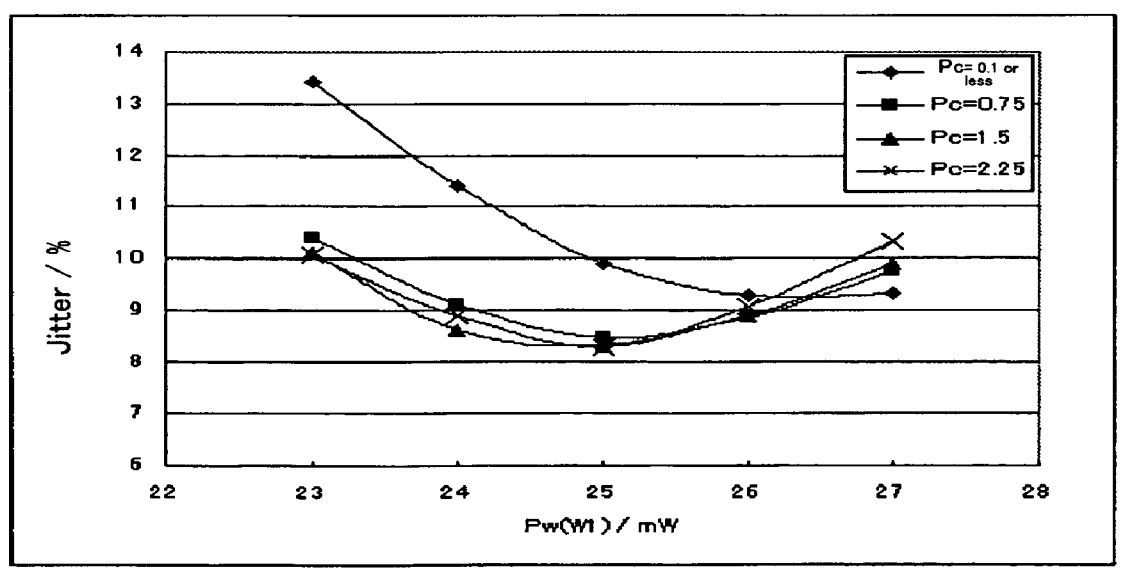
FIG. 9 is a graph showing another example of change in jitter value relative to values of Pc/W4 in the present invention.
Figure 10:
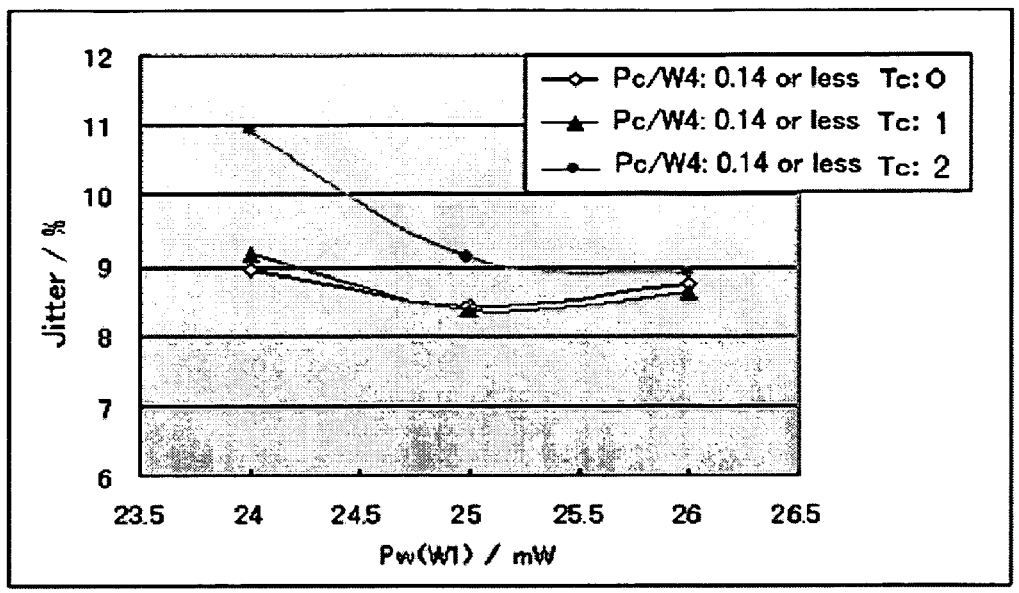
FIG. 10 is a graph showing still another example of change in jitter value relative to values of Pc/W4 in the present invention.
Figure 11:
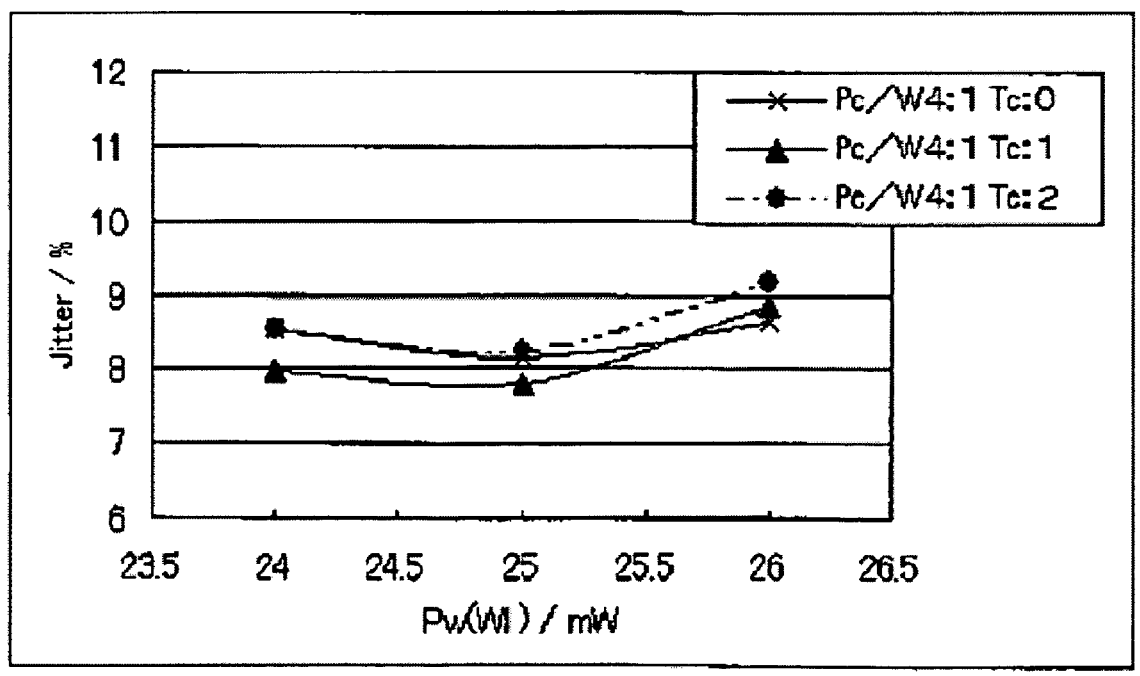
FIG. 11 is a graph showing still yet another example of change in jitter value relative to values of Pc/W4 in the present invention.
Figure 12:
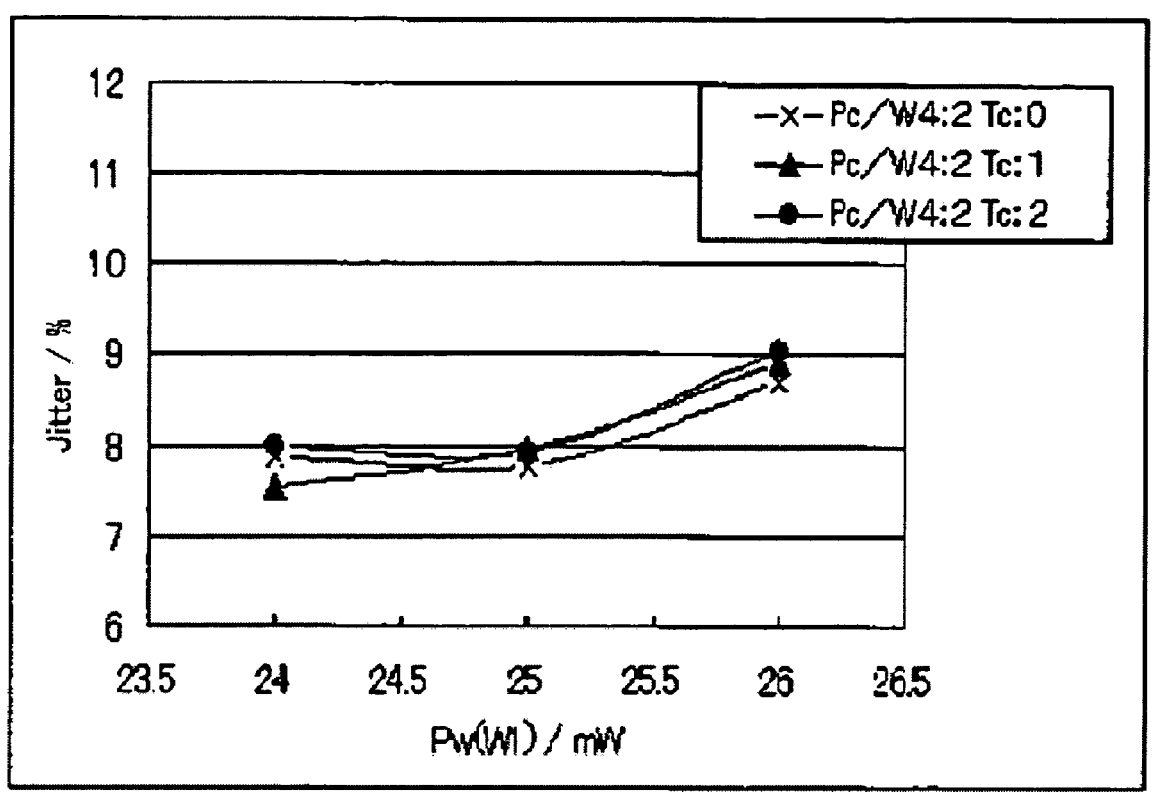
FIG. 12 is a graph showing still yet another example of change in jitter value relative to values of Pc/W4 in the present invention.
Figure 13:
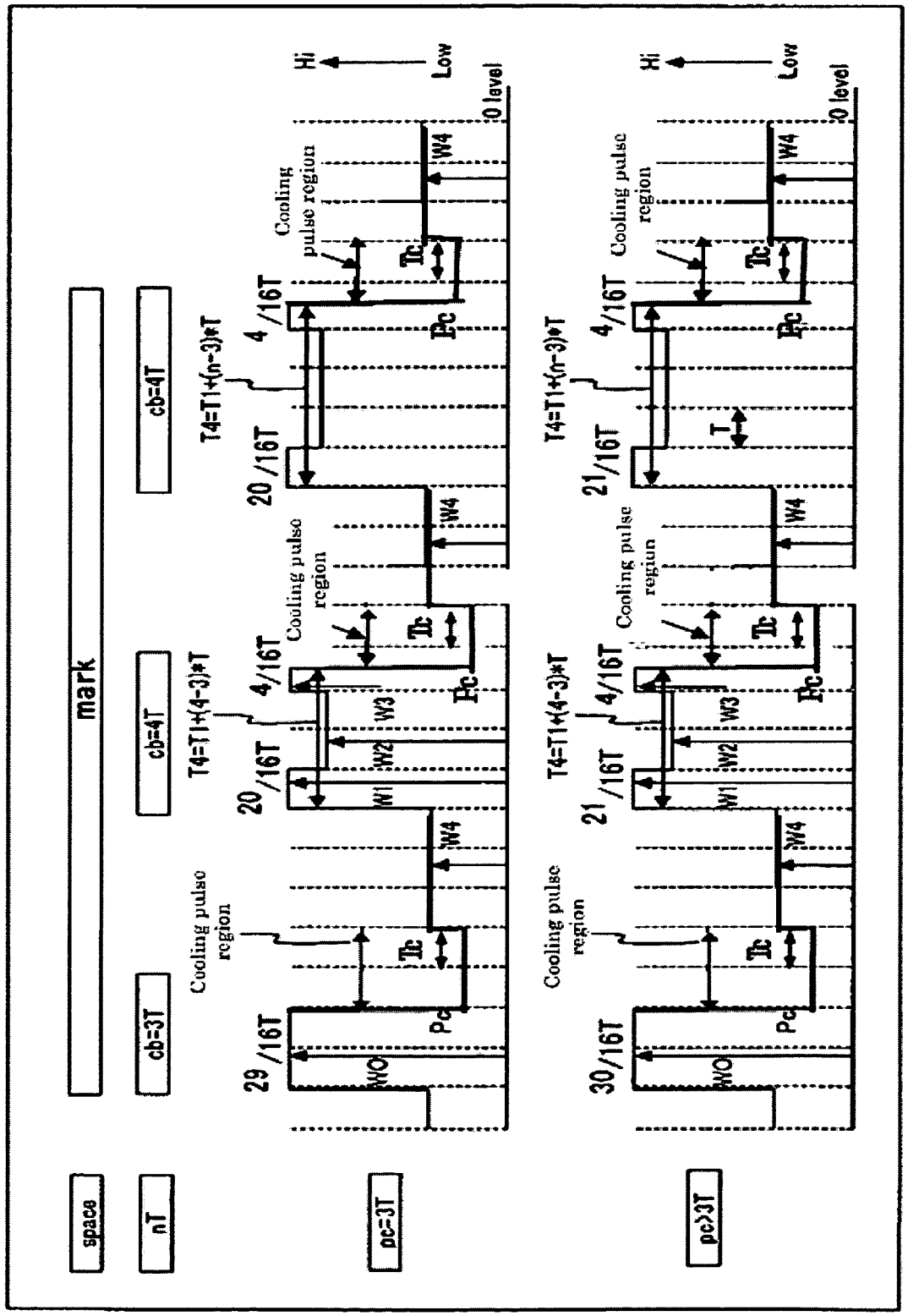
FIG. 13 is an illustration of a pulse exposure pattern showing that the irradiation time of the cooling pulse Tc in the present invention is one time or less the basic clock cycle T.

|  | Recording linear velocity (m/s) | Pc (mW) | Tc (T) | W1 (mW) | W1/W0 | W1/W2 | W1/W3 | W4/W1 | Pc/W4 | FIG. |
|---|---|---|---|---|---|---|---|---|---|---|
| Ex. 1 | 12.64 | 0.75 | 2 | 23-27 | 1 | 1.2 | 1 | 0.03 | 1.0 | FIGS. 8, 9 |
| Ex. 2 | 12.64 | 1 | 2 | 25 | 1 | 1.2 | 1 | 0.03 | 1.3 | FIG. 8 |
| Ex. 3 | 12.64 | 1.25 | 2 | 25 | 1 | 1.2 | 1 | 0.03 | 1.7 | FIG. 8 |
| Ex. 4 | 12.64 | 1.5 | 2 | 23-27 | 1 | 1.2 | 1 | 0.03 | 2.0 | FIGS. 8, 9 |
| Ex. 5 | 12.64 | 1.75 | 2 | 25 | 1 | 1.2 | 1 | 0.03 | 2.3 | FIG. 8 |
| Ex. 6 | 12.64 | 2 | 2 | 25 | 1 | 1.2 | 1 | 0.03 | 2.7 | FIG. 8 |
| Ex. 7 | 12.64 | 2.25 | 2 | 23-27 | 1 | 1.2 | 1 | 0.03 | 3.0 | FIGS. 8, 9 |
| Compara. Ex. 1 | 12.64 | 3 | 2 | 25 | 1 | 1.2 | 1 | 0.03 | 4.0 | FIG. 8 |
| Compara. Ex. 2 | 12.64 | 0.1 or less | 2 | 23-27 | 1 | 1.2 | 1 | 0.03 | 0.14 or less | FIGS. 8, 9 |
| Ex. 8 | 12.64 | 0.1 or less | 0 | 24-26 | 1 | 1.2 | 1 | 0.03 | 0.14 or less | FIG. 10 |
| Ex. 9 | 12.64 | 0.75 | 0 | 24-26 | 1 | 1.2 | 1 | 0.03 | 1.0 | FIG. 11 |
| Ex. 10 | 12.64 | 1.5 | 0 | 24-26 | 1 | 1.2 | 1 | 0.03 | 2.0 | FIG. 12 |
| Ex. 11 | 12.64 | 0.1 or less | 1 | 24-26 | 1 | 1.2 | 1 | 0.03 | 0.14 or less | FIG. 10 |
| Ex. 12 | 12.64 | 0.75 | 1 | 24-26 | 1 | 1.2 | 1 | 0.03 | 1.0 | FIG. 11 |
| Ex. 13 | 12.64 | 1.5 | 1 | 24-26 | 1 | 1.2 | 1 | 0.03 | 2.0 | FIG. 12 |
| Compara. Ex. 3 | 12.64 | 0.1 or less | 2 | 24-26 | 1 | 1.2 | 1 | 0.03 | 0.14 or less | FIG. 10 |
| Ex. 14 | 12.64 | 0.75 | 2 | 24-26 | 1 | 1.2 | 1 | 0.03 | 1.0 | FIG. 11 |
| Ex. 15 | 12.64 | 1.5 | 2 | 24-26 | 1 | 1.2 | 1 | 0.03 | 2.0 | FIG. 12 |

FIG. 8 shows results of jitter values in the case where W1 was set at 25 mW for optical recording media of Examples 1 to 7 and Comparative Examples 1 and 2. The results verified that excellent jitter property could be obtained when Pc/W4 was 1.0 to 3.0. Similarly, FIG. 9 shows results of jitter property of optical recording media of Examples 1, 4, and 7, and Comparative Example 2. The results verified that excellent jitter property could be obtained when Pc/W4 was 1.0 to 3.0. Further, FIGS. 10, 11, and 12 respectively show results of jitter property of optical recording media of Examples 8 to 15, and Comparative Example 3, and excellent jitter property could be obtained by setting Tc to 1T or less when Pc/W4 was 0.14 or less.

What is claimed is:

1. A recording method for a dye-based recordable optical recording medium comprising:
    recording shortest marks on a recording layer containing a dye formed on a substrate having a guide groove by the use of one pulse beam, and
    recording second shortest marks or still longer marks at a pulse power as high as or lower than that of the shortest marks by the use of one pulse beam of which two sites of the front edge and the rear edge of pulse are highly energized for a given length of time,
    wherein a ratio Pc/W4 (Pc represents the exposure dose of a cooling pulse beam applied on the rear edge of pulse, and W4 represents the power of irradiation beams other than those engaged in formation of marks) during recording of each of marks at a recording linear velocity of 12 m/s or more is set from more than 1.0 to 3.0.

2. The recording method for a dye-based recordable optical recording medium according to claim 1, wherein the exposure dose of the cooling pulse beam Pc after that the pulse is applied with beams is set to 0.1 mW or less, and the irradiation time Tc is set to be as long as or shorter than the basic clock cycle T.

3. The recording method for a dye-based recordable optical recording medium according to claim 1, wherein in the recording of each of marks with the use of pulse beams, the guide groove is formed with wobble grooves, and the wobble frequency based on when the basic clock cycle is represented by T is ranging from 4T to 96T.

4. The recording method for a dye-based recordable optical recording medium according to claim 1, wherein the wavelength of the pulse beams is 600 nm to 720 nm.

5. The recording method for a dye-based recordable optical recording medium according to claim 1, wherein in the recording of each of marks with the use of pulse beams, signals are recorded at a recording linear velocity of 3.83+/−0.03 m/s.

* * * * *